Aug. 19, 1969    H. G. ERNEMAN ET AL    3,462,191
ENERGY DISSIPATER FOR SAFETY BELT ASSEMBLY
Filed Aug. 9, 1967
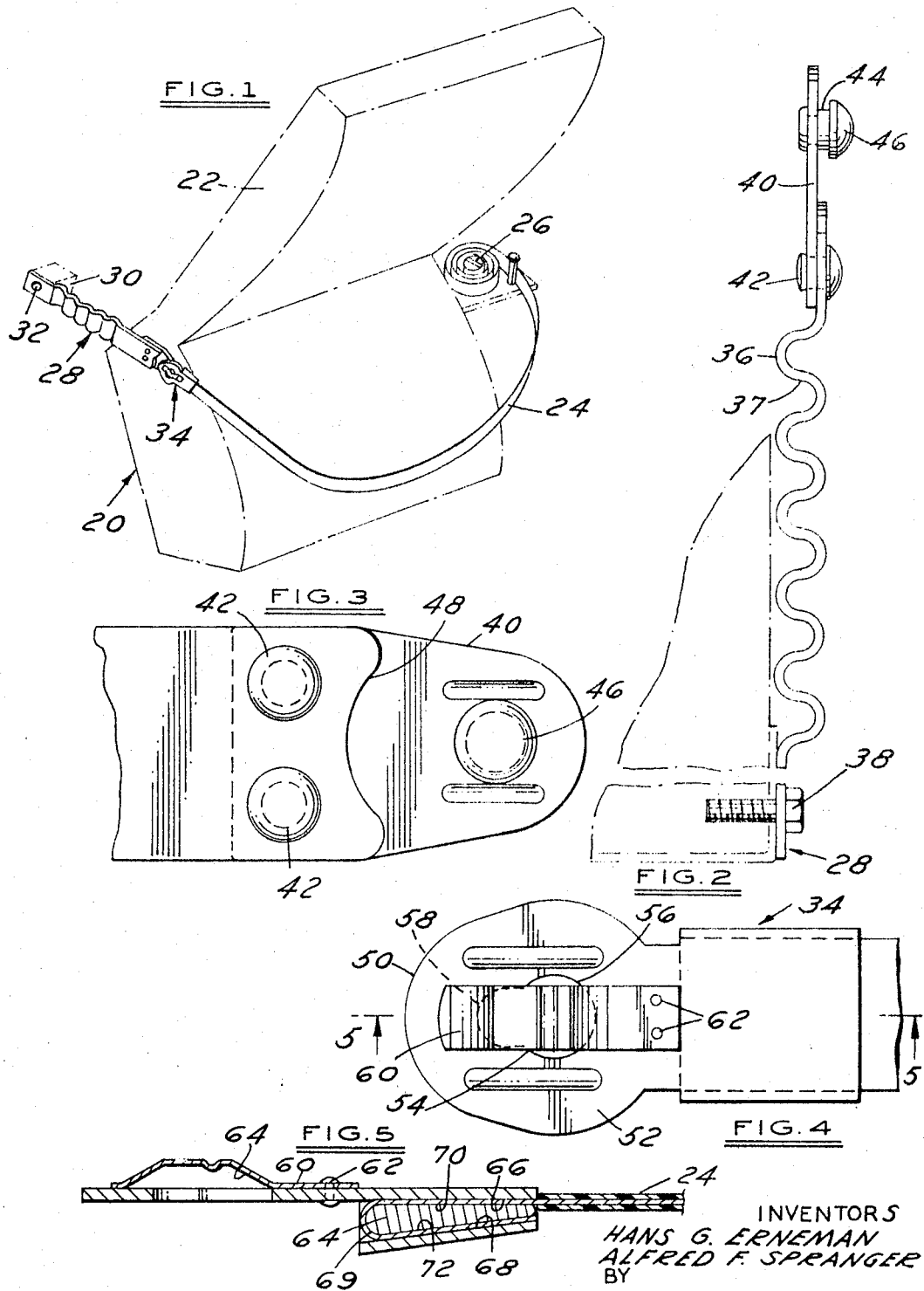
INVENTORS
HANS G. ERNEMAN
ALFRED F. SPRANGER
BY
Barnes, Kisselle, Raisch & Choate
ATTORNEYS United States Patent Office 3,462,191
Patented Aug. 19, 1969

3,462,191
ENERGY DISSIPATER FOR SAFETY
BELT ASSEMBLY
Hans G. Erneman, Royal Oak, Mich., and Alfred F. Spranger, 19296 Rockcastle, Harper Woods, Mich. 48236; said Hans G. Erneman assignor to Alfred F. Spranger, Wayne County, Mich.
Filed Aug. 9, 1967, Ser. No. 659,464
Int. Cl. B60r 21/10
U.S. Cl. 297—385                       2 Claims

ABSTRACT OF THE DISCLOSURE

This invention relates to improvements in safety belt assemblies of the type used in airplanes and vehicles. This application discloses a recoilless means of dissipating a portion of the energy transmitted to a safety belt during a collision or rapid deceleration, by plastic deformation of a corrugated metal strip. The dissipation of a portion of the energy which is transmitted to the safety belt when it is constraining a passenger during a collision, limits to a safe level the maximum total force to which the passenger's pelvic region is subjected during the collision. This materially reduces the risk of substantial injury to the passenger's pelvis.

Background of the invention

This invention relates to improvements in safety belt assemblies and more particularly to an energy dissipating device which limits to a safe level the maximum total force to which a passenger's pelvic region is subjected during a collision or other rapid deceleration.

In the prior art fabric safety belt assemblies and particularly in the prior art steel safety belt assemblies such as in disclosed in my U.S. Patent No. 3,116,092, there is a possibility of seriously injuring the pelvis or surrounding organs of the passenger by the force applied to the pelvic region by the safety belt when it is constraining the passenger during a severe collision. When fabric belts are used to constrain the passenger, they give or stretch during the collision, thereby dissipating part of the energy transmitted to the fabric belt by the momentum of the passenger and reducing the maximum force to which the passenger's pelvis is subjected. The use of a spring actuated absorber does not solve this problem because the spring has a dangerously powerful recoil. Therefore, it is necessary to provide a recoilless means of dissipating the energy transmitted to the safety belt during a collision. Fabric belts also have a disadvantage termed "roping" which means that the total area of the belt which is in contact with the pelvic region decreases during the collision or impact. This tends to increase the force per unit of area to which the pelvis is subjected during the collision.

This invention dissipates some of the energy that is transmitted to the safety belt during a collision without any danger of recoil by plastically deforming a corrugated metal strip. The configuration and dimensions of the metal strip are designed to limit the maximum force applied by the safety belt to the passenger's pelvis to a safe, fairly uniform level during the collision. When this invention is used in conjunction with steel safety belts, the combined assembly provides a unit with a positive means of controlling the maximum force to which a passenger's pelvis is subjected without the roping disadvantage inherent in fabric safety belts.

Description of the invention

This invention relates to improvements in safety belt construction such as is used in airplanes and vehicles and more particularly to a means of dissipating some of the energy that is transmitted to the safety belt by the rapid change of momentum of the passenger during a collision or other rapid deceleration of the vehicle.

A principal object of this invention is to provide a recoilless means of limiting or controlling at a safe level the maximum force to which a safety belt will subject the pelvis of a human being during a collision or other rapid deceleration of a vehicle.

Another object of this invention is to provide a means of easily attaching a safety belt to and removing it from the force limiting means.

Another object of this invention is to provide safety belt assemblies constructed of steel bands or other flexible relatively inelastic materials, such as those disclosed in my U. S. Patent No. 3,116,092 with a maximum pelvic force limiting means such as is inherent in fabric belts; but without also incorporating the so-called "roping" disadvantage of fabric belts. The term "roping" has been applied to the marked tendency of a fabric belt to become narrower and longer when it is subjected to the force created by a collision or other rapid deceleration. When the fabric belt narrows, the total belt area in contact with the pelvis is decreased which subjects the pelvis to a greater force per unit of area and may result in a substantial injury to the pelvis.

The "give" or stretching of the fabric belt during the collision does help to limit the total force applied to the pelvis; hence, there is an inherent force controlling factor in fabric safety belts. However, only the combined steel or other flexible relatively inelastic material safety belts and the force limiting means of this invention provide a safety belt assembly that has both a fixed belt width and, hence, a constant pelvic region contact area, and a means of limiting the total force to which the pelvic region is subject during a collision or other rapid deceleration.

Other objects and features of this invention will be apparent from the following description and claims in which there is found the manner of making and using the invention and the best mode contemplated by the inventors for carrying out the invention.

Drawings accompany this discosure and the various views thereof may be briefly described as:

FIGURE 1, a perspective view of a seat illustrating the position of the energy dissipater in a safety belt assembly.

FIGURE 2, a side view of the energy dissipater.

FIGURE 3, a plan view of a lock plate attached to the energy dissipater.

FIGURE 4, a plan view of a belt fastening and lock device.

FIGURE 5, a sectional view of line 5—5 of FIGURE 4.

Referring to the drawings:

In FIGURE 1, a cushion seat 20 of standard construction having a back 22 is shown. This can be a cushion for an airplane or for commercial and passenger vehicles. A steel safety belt 24, such as disclosed in my U.S. Patent No. 3,116,092, is attached at one end 26 to the seat 20 or to a floor pan or other suitable anchorage. If it is so desired, a safety buckle, such as is disclosed in my U.S. Patent No. 3,276,084, can be utilized with the steel safety belt 24. The energy dissipater 28 is anchored to a floor pan 30 of a vehicle at 32, or other suitable anchorage such as the seat frame itself or the vehicle frame, and is coupled to the belt 24 by a belt clamping and lock device 34. The belt can be either a lap belt or a shoulder strap.

As shown in FIGURE 2, the energy dissipater 28 is formed from a strap of steel or other ductile material and contains a sinuous surface area composed of a plurality of rounded sinuses 36. The sinuses 36 form a plurality of surface areas 37 which are generally transverse to the direction of the tensive forces to which the device is subjected. At one end of the dissipater 28 an opening 38 is provided for anchoring the dissipater 28 to the floor pan 30 or other suitable anchorage. At the opposite end of the dissipater 28 a lock plate 40 is secured by rivets 42 or other suitable means to the dissipater 28. A lock pin 44 with an upset or enlarged head 46 is secured to the lock plate 40. A concave surface 48 in the end of the dissipater 28 adjacent to the lock plate 40 coacts with the cammed latch plate surface 50 of the clamping and lock device 34 as shown in FIGURE 4 and more fully described below.

The energy dissipater 28 is designed so that it will begin to dissipate the energy transmitted to it by the safety belt at a total force level that is safe for the human pelvic region. The energy dissipater should be designed so that it dissipates sufficient energy to keep the total force that the safety belt transmits to the pelvic region of the person sitting in the seat at a fairly constant level during the collision. It has been experimentally determined that rounded sinuses 36 provide a more nearly constant maximum total force level than do sharp or pointed sinuses.

In the preferred embodiment the energy dissipater is formed of a hot or cold rolled steel strap and is about two inches wide, 0.109 of an inch thick (12 gauge), and contains nine half-circular and two-circular surfaces (a total of eleven) all with an internal radius of about three-sixteenths of an inch. This configuration has performed satisfactorily when formed from metal straps ranging from 0.093 to 0.125 of an inch thick. After the energy dissipater is formed, it is annealed so that the steel is dead soft for maximum ductility.

The energy dissipater 28 dissipates the energy transmitted to it by the safety belt 24 by plastically deforming the strap of steel or other material from which it is made. Plastic deformation is the deformation that occurs beyond the elastic limit. Since the surface areas 37 are generally transverse to the direction of the tensive force to which the energy dissipater 28 is subjected, most of the plastic deformation occurs in the area of the rounded sinuses 36. This means that the energy dissipater is permanently elongated or deformed when dissipating the energy transmitted to it by the safety belt during a collision or other sudden deceleration; therefore, the dissipater 28 should only be used once. It is a one-shot unit and should be replaced after each collision.

A latch plate 52 of the clamping and lock device 34 contains a bulbous-shaped opening 54, the larger portion 56 of which will pass over the upset head 46 of the locking pin 44 and the smaller portion 58 of the bulbous opening 54 will slidably engage with the locking pin 44. The latch plate 52 contains a cam-shaped edge surface 50 which co-acts with the concave surface 48 of the dissipater 28 so that the smaller portion 58 of the bulbous opening 54 is cammed into engagement with the locking pin 44 when the larger portion 56 of the bulbous opening 54 is placed over the locking pin 44 and the latch plate 52 is rotated relative to the lock pin 44. A retainer spring clip 60 attached to the latch plate 52 by rivets 62 also tends to urge the locking pin 44 into engagement with the smaller opening 58 of the latch plate 52. When the upset head 46 of the locking pin 44 passes through the larger opening 56 it contacts surface 64 of spring clip 60 causing the clip to be displaced relative to the latch plate 52, thereby urging the pin 44 into engagement with opening 58 of the latch plate 52.

The cam surface 50 of the latch plate 52 and the concave surface 48 of the dissipater 28 are so designed that the latch plate 52 can't be removed or disconnected from the lock pin 40 except when the longitudinal axes of the clamping and lock device 34 and the dissipater 28 are parallel with each other. Since the axis of the clamping and lock device 34 is inclined to the axis of the dissipater 28 when they are in their normal operating position, as shown in FIGURE 1, they are coupled together in such a manner that they cannot be accidentally disconnected. It is considered to be obvious that the described cam action locking device could also be constructed with a step containing concave edge surface 44 as an integral part of the lock plate 36 or with both the concave edge surface 44 and the lock plate 36 as an integral part of the energy dissipater 30.

The flexible inelastic safety belt 24 is secured to the clamping and lock device 34 by a wedge 64 which is forced into contact with the mating surfaces 66 and 68 on the clamping and lock device 34 by tension on the steel safety belt. The end surface 69 of wedge 64 is generally rounded so that the safety belt 24 can be wrapped around the wedge and forced into contact with both surfaces 66, 68 of the passageway. The generally rounded end surface 69 of wedge 64 prevent the safety belt 24 from being subjected to shear forces which would be developed if the belt were to come in contact with sharp corners on the wedge 64. The converging surfaces 66, 68 on the clamping and lock device 34 form a truncated wedge-shaped passageway or receptacle for wedge 54. The angular relationship of surfaces 70 and 72 of the wedge 64 and the mating surfaces 66 and 68 of the clamping and lock device 34 is such that there is a self-clamping or self-locking action of the wedge 64 and the safety belt 24. A suitable angle for this purpose is an included angle of 6° between the planes of the surfaces 70 and 72 of the wedge 64. Unlike most other types of mechanical joints when placed under tension, this type of joint has an efficiency of 100 percent. This means that the joint between the safety belt 24 and the clamping and lock device 34 will withstand as great a force in tension as the belt 24 can withstand.

To use the energy dissipater after it has been properly installed in a vehicle seat, the passenger places the safety belt across the lower part of his abdomen and attaches or connects the clamping and lock device to the energy dissipater. The longitudinal axis of the clamping and lock device forms an oblique angle with the longitudinal axis of the energy dissipater due to the tension on the belt and the position of the energy dissipater, thereby preventing the energy dissipater and the safety belt from becoming accidentally unlocked. If the vehicle is subjected to a collision or other extremely rapid deceleration, the dissipater dissipates a portion of the energy that is transmitted to the safety belt when it is constraining the passenger in the vehicle seat. The dissipation of this energy limits the total force to which the pelvic region is subjected to a safe level, thereby materially reducing the risk of substantial injury to the passenger's pelvis or surrounding organs.

What is claimed as new is as follows:

1. A seat belt combination including an anchor means for the frame or floor of a vehicle and a seat belt to pass around a passenger in a seat in said vehicle with releasable means for attachment to the anchor means, said seat belt comprising a strip of flexible, inelastic material such as a metal strip, that improvement which comprises:
   (a) a means for attaching the strip material to the anchor means which comprises a housing having a wedge-shaped recess therein converging away from the anchor means and having a substantially rectangular cross-section with flat interior surfaces approximately the width of the strip material,
   (b) a wedge means shaped fit said recess having flat converging surfaces adapted to mate with the flat surfaces of said recess, and
   (c) a relatively flexible, inelastic strip of safety belt material having one end passing over each flat surface of said wedge and snubbed around the wider end of said wedge lying disposed against the flat surfaces of said recess wherein tension on the belt away from said anchor means will tighten said wedge in said recess and lock said belt material securely in said housing.

2. A device as defined in claim 1 in which the wider end of the wedge is curved on an axis passing transversely of the wedge, the curvature blending with the flat surfaces of the wedge wherein to provide a radius support for the belt material as it passes from one flat surface to the other.

References Cited

UNITED STATES PATENTS

| | | | |
|---|---|---|---|
| 134,052 | 12/1872 | Gurley | 24—25 |
| 1,261,835 | 4/1918 | Martin | 24—225 |
| 2,291,674 | 8/1942 | Alden | 24—224 |
| 2,505,955 | 5/1950 | Fuller | 24—224 |
| 3,106,989 | 10/1963 | Fuchs | 297—386 X |
| 3,116,092 | 12/1963 | Spranger | 297—388 |
| 3,126,072 | 3/1964 | Johansson | 297—386 X |
| 3,169,291 | 2/1965 | Stacherl | 24—196 |
| 3,198,288 | 8/1965 | Presunka | 297—386 X |
| 3,361,475 | 1/1968 | Villiers | 297—386 |

JAMES T. McCALL, Primary Examiner

U.S. Cl. X.R.

24—224; 297—386